Nov. 2, 1926.  
F. A. SNYDER ET AL  
1,605,861  
DETACHABLE SCARIFIER TOOTH  
Filed August 21, 1922
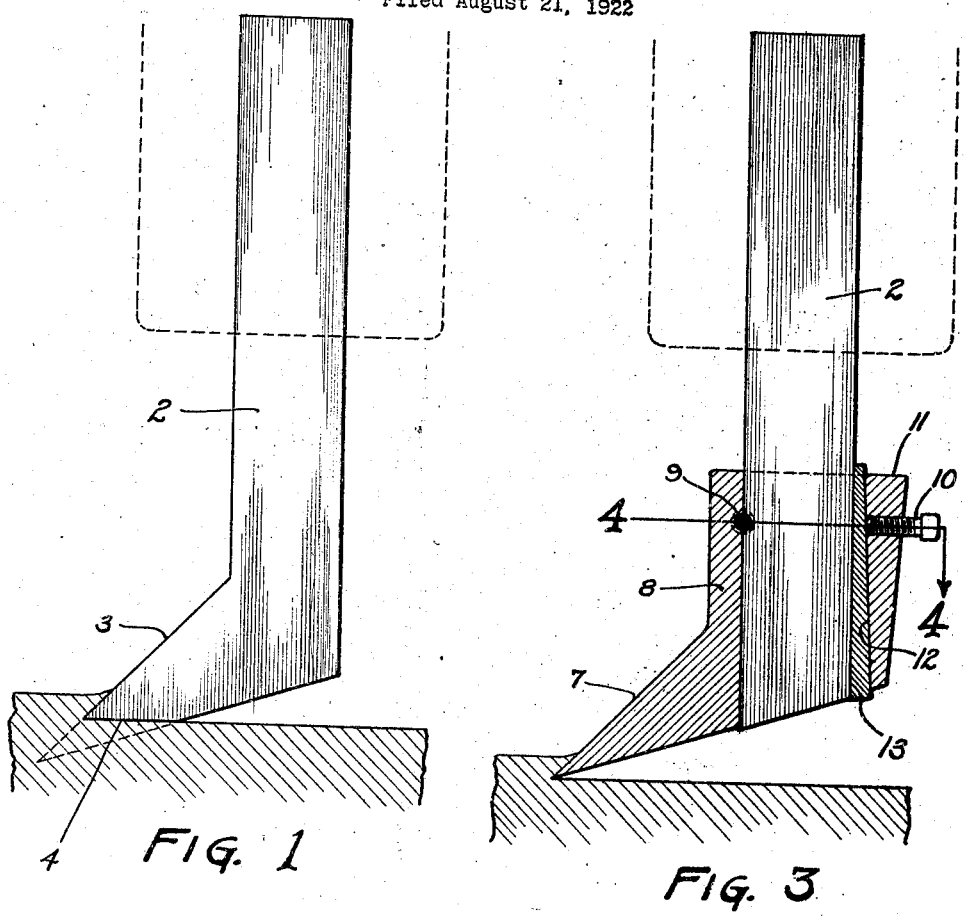
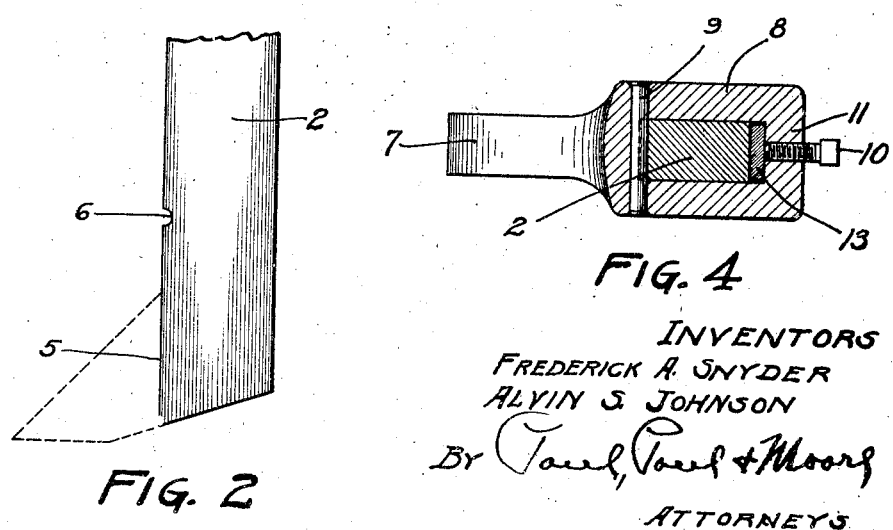
INVENTORS  
FREDERICK A. SNYDER  
ALVIN S. JOHNSON  
By Paul, Paul & Moore  
ATTORNEYS Patented Nov. 2, 1926.

1,605,861

UNITED STATES PATENT OFFICE.

FREDERICK A. SNYDER, OF ST. PAUL, AND ALVIN S. JOHNSON, OF MINNEAPOLIS, MINNESOTA.

DETACHABLE SCARIFIER TOOTH.

Application filed August 21, 1922. Serial No. 583,285.

In the construction of streets and highways, it is customary to use a machine known as the scarifier, for digging up and loosening the hard top soil preparatory to grading. The digging teeth in such a machine are formed on the lower ends of upright shanks mounted in the machine frame and arranged at an angle to the ground line so that they will dig into the top surface as the machine moves along. These teeth are made of steel but the top soil is so hard and the teeth are subjected to such continuous wearing action that they soon become dull and blunted or worn away to such an extent that it is necessary to throw away the remaining part of the tooth and shank and substitute an entire new one in place thereof. This work adds considerably to the upkeep or maintenance of the machine. The object of our invention is to provide a tooth attachment which, when the shank tooth becomes worn can be substituted for the tooth, provision being made for rigidly mounting the substitute on the shank and holding it as firmly thereon as though it were an integral part of the shank itself.

A further object is to provide a substitute or repair tooth which can be easily and quickly mounted on the shank and when broken or worn can be replaced by another. The invention consists generally in various constructions and combinations all as hereinafter described and pointed out in the claims.

In the accompanying drawings forming part of this specification, Figure 1 is a detail view showing the shank and tooth of the scarifier indicating in dotted lines the original length of the tooth, and in full lines how it is worn down and blunted by contact with the soil.

Figure 2 shows the shank with the tooth cut off and provision made for clamping the substitute tooth thereon.

Figure 3 is a detail sectional view showing the manner of mounting the substitute tooth on the shank.

Figure 4 is a sectional view on the line 4—4 of Figure 3.

In the drawing, 2 represents a scarifying shank, and 3, a tooth formed integrally thereon as usual in machines of this type. We have indicated at 4 how the tooth may be worn by contact with the soil to such an extent that it cannot satisfactorily perform its functions. When a tooth reaches this state, we propose to cut it off along the line indicated at 5 in Figure 2. We then provide a transverse groove 6 in preferably the forward longitudinal edge of the shank by filing or other suitable means, and then we provide a substitute tooth 7 having a box or housing 8 that is adapted to receive the lower end of the shank, the under surface of the tooth being preferably flush with the lower end of the shank as indicated in Figure 3. The box has a long bearing surface on the shank as indicated, and is provided with a transverse pin 9 upset or headed at each end and adapted to fit into the groove 6 as shown plainly in Figure 3, thus holding the box firmly against vertical movement on the shank. On the other side of the shank, a set-screw 10, is provided tapped into the rear wall 11 of the box, and the inner face of said rear wall is beveled as indicated at 12, and adapted to receive the correspondingly inclined surface of a wedge 13 which is inserted between the rear wall of the box and the rear edge of the shank. This wedge is forced in to its seat until the box is fitted snugly on the shank and the pin 9 clamped firmly in the groove in the forward edge of the shank. When this has been done, the set-screw 10 is tightened and thereupon the wedge will be firmly held in place in the box and by reason of its long bearing surface on the shank, there will be no possibility of twist or oscillation of the box on the shank and the substitute tooth will be as rigid and as firmly held as it would be if it were formed integrally with the shank.

Instead of cutting off the shank of the tooth and mounting the substitute tooth in place of the worn one, we may discard entirely the worn tooth and its shank and provide an entirely new shank, mounting the substitute tooth thereon in the manner described above. In building new machines, new shanks would be furnished, and in repairing old machines we may provide new shanks or cut off the old ones, as preferred. The construction described, allows us to discard the worn tooth, using the shank as a support for the substitute, or we may discard both the tooth and the shank.

With this device a scarifying machine can be kept in proper working condition without withdrawing it from the field; for as fast as the original teeth wear out they can be cut off and the substitute teeth mounted on the shanks with comparatively little labor and loss of time, when ordinarily it is necessary to withdraw the machine from the work, remove the entire shank and its tooth and substitute another shank and tooth therefor.

Other ways may be devised for securing the substitute tooth in its position on the shank, but we prefer the manner shown as it is simple and effective and the tooth can be mounted without the use of special tools.

We claim as our invention:

1. A scarifier comprising a tooth formed with upwardly and rearwardly inclined top and bottom faces and having at its rear an upright hollow box-like portion open at top and bottom, the internal walls whereof extend from the top of the box-like portion to the upwardly and rearwardly inclined lower face of the tooth, an independent shank fitted in said hollow box-like portion with its lower end terminating substantially in the plane of the lower upwardly inclined face of the tooth and constituting substantially a continuation thereof, and means for separably connecting the tooth and shank.

2. A scarifier comprising a tooth formed with upwardly and rearwardly inclined top and bottom faces and having at its rear an upright hollow box-like portion for the reception of a shank, the internal walls of the box-like portion extending from its top to the upwardly and rearwardly inclined lower face of the tooth, an independent shank fitted in the hollow box-like portion of the tooth and extending therein from the top thereof to upwardly and rearwardly inclined bottom face of the tooth, and means to prevent the separation of the shank and tooth consisting of a recess and projection to fit therein, said recess and projection being located at the junction of the shank and one wall of the box-like member.

In witness whereof, we have hereunto set our hands this 16th day of August, 1922.

FREDERICK A. SNYDER.
ALVIN S. JOHNSON.